United States Patent [19]

Siegwart

[11] 4,124,037
[45] Nov. 7, 1978

[54] FLUID FLOW REGULATOR

[76] Inventor: Emil Siegwart, Michael-Blatter-Str. 6, 6603 Sulzbach-Neuweiler, Germany

[21] Appl. No.: 789,284

[22] Filed: Apr. 20, 1977

[30] Foreign Application Priority Data

Apr. 24, 1976 [DE] Fed. Rep. of Germany ....... 2618037

[51] Int. Cl.² .............................................. G05D 7/01
[52] U.S. Cl. .................................... 137/499; 137/521; 308/166
[58] Field of Search ........ 137/499, 520, 521, 527–528; 308/163, 166

[56] References Cited

U.S. PATENT DOCUMENTS

| 1,237,105 | 8/1917 | Scognamillo | 308/166 UX |
| 1,493,999 | 5/1924 | Lombardi | 308/166 |
| 2,044,921 | 6/1936 | Swanland | 137/520 X |
| 3,424,504 | 1/1969 | Emery | 308/163 X |
| 3,452,762 | 7/1969 | Fahre | 137/499 |

Primary Examiner—Robert G. Nilson
Attorney, Agent, or Firm—Peter K. Kontler

[57] ABSTRACT

The shaft for the flap of a fluid flow regulator extends through the tubular housing of the regulator and its end portions are received in thrust bearings which subject the shaft to axial stresses. The bearings have internally threaded sleeves which are bonded to the housing, externally threaded plastic plugs which mate with the respective sleeves and have sockets for the respective end portions of the shaft, and hard metallic balls in the innermost portions of the respective sockets. The flap has two mutually inclined sections at the opposite sides of the shaft and is biased to open position, in which one of its sections lies flush against a centrally located partition in the housing, by a helical spring whose characteristic can be changed from the outside of the housing.

11 Claims, 3 Drawing Figures

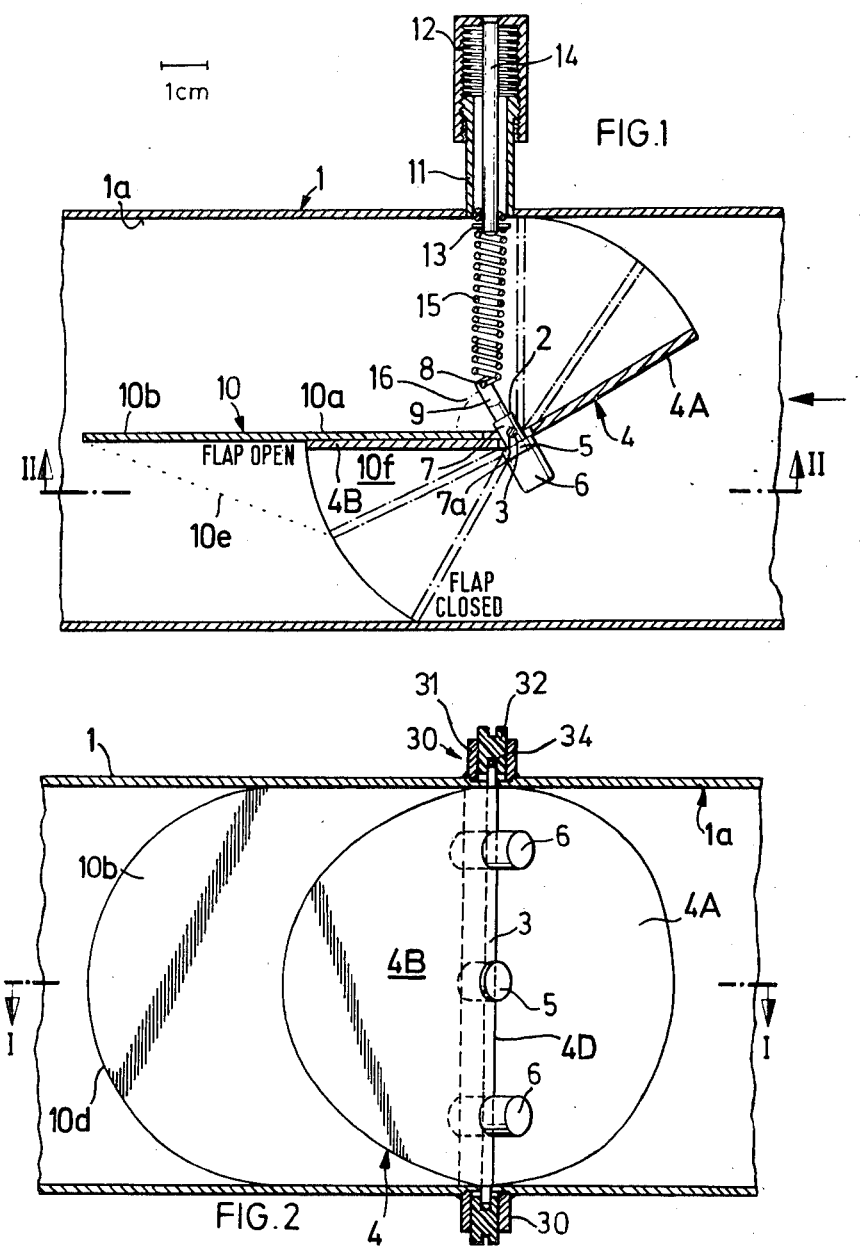

FLUID FLOW REGULATOR

BACKGROUND OF THE INVENTION

The present invention relates to fluid flow regulating apparatus in general, and more particularly to improvements in fluid flow regulators of the type disclosed in my U.S. Pat. Nos. 3,965,928 and 3,996,961.

U.S. Pat. No. 3,965,928 discloses a flow regulator for ducts wherein a shaft which extends transversely of the passage for the flow of a fluid medium carries a substantially V-shaped flap which is biased to open position by a helical spring whereby one section of the flap extends upstream of the shaft and the other section lies against a partition which is located in the plane of the shaft and divides the passage into two substantially mirror symmetrical channels. When the pressure of inflowing fluid increases, the fluid bears against one side of the one section and turns the flap against the opposition of the spring toward or all the way to the closed position. Such flow regulators exhibit several important advantages, especially as regards the sensitivity of the flap, i.e., its ability to move into a different position in response to minute changes of fluid pressure whereby the flap insures that the quantity of fluid that flows through the duct remains constant.

It has been found that the patented flow regulators operate highly satisfactorily when the fluid flows at a predictable rate. However, if the column of fluid which passes through the regulator housing vibrates, the flap is likely to flutter which results in short-lasting deviations from an optimum position and is likely to cause pronounced wear upon the bearings for the shaft. The shaft of the flow regulator which is disclosed in U.S. Pat. No. 3,965,928 is mounted in highly sensitive point bearing arrangements of the type resembling instrument pivot bearings. Such bearings are especially likely to undergo rapid and pronounced wear in response to flutter of the flap whereby the pointed tips of the shaft are likely to leave the sockets. Moreover, the utilization of highly sensitive bearings contributes significantly to the cost of the flow regulator.

OBJECTS AND SUMMARY OF THE INVENTION

An object of the invention is to provide a fluid flow regulator wherein the tendency of the flap to flutter is reduced or completely eliminated in a simple and reliable way.

Another object of the invention is to provide a flow regulator wherein high-frequency vibrations of the fluid column which passes through the housing of the flow regulator cannot or are unlikely to cause undesirable movements of the flap and/or extensive wear upon other moving parts.

A further object of the invention is to provide novel and improved bearings for the shaft which carries the flap of the above outlined flow regulator.

An additional object of the invention is to provide novel and improved bearings which can be installed in existing flow regulators as a superior substitute for presently utilized bearings.

Another object of the invention is to provide a flow regulator wherein the flap cannot rub against the housing during movement between open and closed positions.

An ancillary object of the invention is to provide the flow regulator with bearings which mount the end portions of the shaft for the flap and are readily accessible and adjustable at all times, i.e., also when the flow regulator is in use.

The invention resides in the provision of a fluid flow regulator wherein the passage for the flow of a fluid medium within a tubular housing is traversed by a rotary shaft having first and second end portions and supporting a valving element, especially a valving element including two mutually inclined sections and being turnable with the shaft between spaced apart first and second positions in which the valving element respectively permits and prevents the flow of a fluid medium through the housing. More particularly, the invention resides in the provision of first and second thrust bearings which are secured to the housing and receive the respective end portions of the shaft. At least one of the bearings includes means (e.g., an elastomeric insert or an externally threaded member) for axially stressing the shaft, i.e., for subjecting the shaft to the action of axially oriented forces which prevent the shaft (and hence the valving element thereon) from wobbling in the axial direction. At least one of the bearings may be provided with a socket which receives or may receive the respective end portion of the shaft with radial play.

It is preferred to construct at least one of the thrust bearings in such a way that the end surface of the respective end portion of the shaft is in mere point contact with the adjacent surface of the bearing. If the end surface of the shaft is a spherical surface, the surface of the bearing is preferably flat, or vice versa. If the spherical surface forms part of the bearing, it preferably constitutes the surface of a spherical element (e.g., a surface-hardened metallic ball of the type used in antifriction ball bearings) which is inserted into the deepmost portion of a socket provided in the respective bearing and receiving the respective end portion of the shaft.

The novel features which are considered as characteristic of the invention are set forth in particular in the appended claims. The improved flow regulator itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is a fragmentary central longitudinal sectional view of a fluid flow regulator which embodies the invention, the section being taken in the direction of arrows as seen from the line I—I of FIG. 2;

FIG. 2 is a sectional view as seen in the direction of arrows from the line II—II of FIG. 1.

DESCRIPTION OF THE PREFERRED EMBODIMENTS

Figure 3:
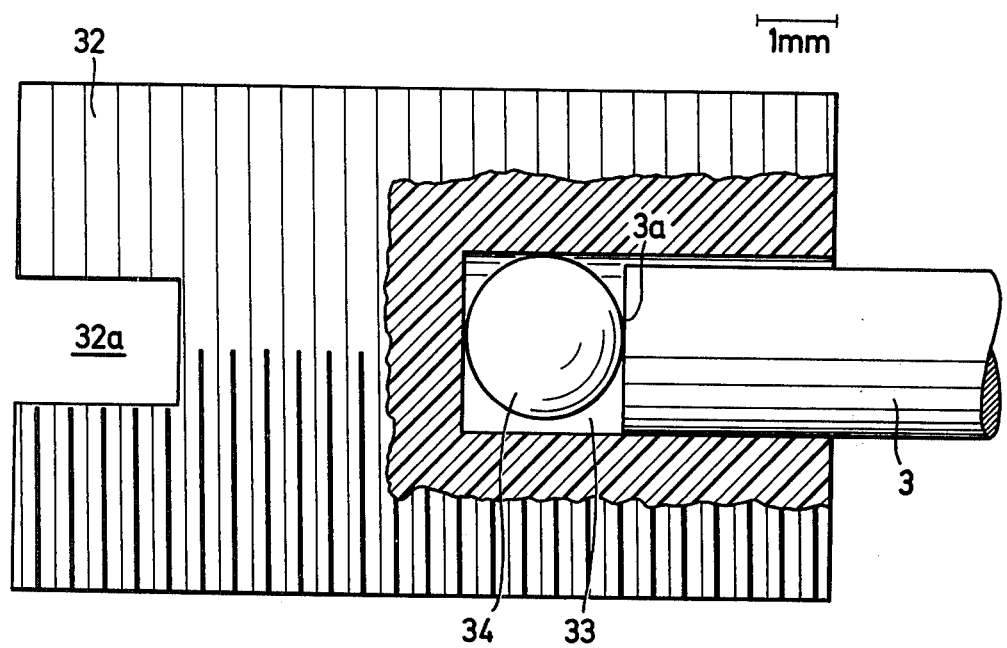
FIG. 3 is a greatly enlarged partly elevational and partly sectional view of a portion of one of the thrust bearings for the shaft.

Referring to FIGS. 1 and 2, there is shown a flow regulator for fluids, preferably gaseous fluids, which comprises a tubular housing or duct 1 defining an elongated passage 1a which is bounded by a cylindrical surface. One end portion of the housing 1 is insertable into a pipe which conveys air, another gas or a liquid. The pipe is preferably provided with suitable depressions or other types of stops which limit the extent to which the housing 1 can be inserted into its interior. One transverse axis of the passage 1a is indicated at 2, and this passage is traversed by a shaft 3 whose axis is parallel with and closely adjacent to the axis 2. The distance between the two axes may equal approximately three percent of the diameter of the passage 1a. The end portions of the shaft 3 are journalled in thrust bearings 30 at least one of which is constructed and assembled in accordance with a feature of the invention.

That portion of the shaft 3 which extends across the passage 1a supports a substantially V-shaped valving element or flap 4 having two mutually inclined sections or panels 4A and 4B making an obtuse angle of approximately 150° (i.e., the plane of the section 4A deviates from the plane of the section 4B by approximately 30°). The edge 4D along which the sections 4A and 4B meet is parallel with and adjacent to the shaft 3.

The means for securing the flap 4 to the shaft 3 so that these parts can turn in unison comprises a centrally located fastener or clamp 5 and two outer fasteners or clamps 6 which flank the fastener 5. Those portions of the fasteners 5 and 6 which are adjacent to the outer sides of the sections 4A and 4B (i.e., to those sides which are visible in FIG. 2) are formed with V-shaped notches bounded by surfaces which lie flush against the respective sections and having deepmost portions which receive the edge 4D. The fasteners 5 and 6 have smaller-diameter extensions or studs 7 which extend through holes in the flap 4 and are formed with bores 7a for the respective portions of the shaft 3. Those end portions of the studs 7 which are remote from the shaft 3 have tapped axial holes for screws 9 whose tips engage the shaft portions in the respective bores 7a to thus hold the shaft 3 against rotation relative to the flap 4 or vice versa. The outer portions of the fasteners 6 are preferably cylindrical and constitute counterweights which cause the gravity line of the flap 4 to coincide with the axis of the shaft 3.

FIG. 1 shows the relatively long screw 9 which mates with the extension 7 of the central fastener 5 and whose free end carries or forms an eyelet 8 constituting a retainer for one end convolution of a helical spring 15. This relatively long screw 9 constitutes a lever arm which places the respective convolution of the spring 15 at a considerable distance from the axis of the shaft 3. The spring 15 biases the flap 4 to the open position which is shown in FIG. 1 by solid lines and in which the inner side of the section 4B lies flush against a plate-like partition 10 in the passage 1. The fluid is assumed to enter the passage 1a at the right-hand end of the housing 1, as viewed in FIG. 1 or 2, and exerts pressure against the outer side of the section 4A, i.e., the fluid tends to move the flap 4 to the closed position which is indicated in FIG. 1 by broken lines. The plane of the section 4A is then normal or substantially normal to the axis of the housing 1 and the inner side of the section 4B is remote from the partition 10. An intermediate position of the flap 4 is shown in FIG. 1 by phantom lines; in such intermediate position of the flap 4, the fluid can flow around both sections on its way toward the outlet of the housing 1.

The means for changing the effective length of the spring 15 comprises a rod 14 which extends substantially radially of the housing 1 and is secured to an internally threaded cap 12 mating with an externally threaded nipple 11 of the housing 1. The rod 14 is attached to the end wall of the cap 12 and its inner end portion carries a diametrically extending pin 13 whose portions extend between two neighboring convolutions of the spring 15. When the cap 12 is rotated, the rod 14 moves axially and its pin 13 moves deeper into or toward the outer end of the spring 15, i.e., the convolutions of the outer portion of the spring 15 can be said to define a helical channel wherein the pin 13 travels toward or away from the retainer 8, depending on the direction of rotation of the cap 12 relative to the sleeve 11. The axial length of the cap 12 is preferably selected in such a way that the pin 13 can change the effective length of the screw 15 (i.e., the distance between the pin 13 and the retainer 8) within a rather wide range. In the illustrated embodiment, the axial length of the cap 12 approximates 2D wherein D is the inner diameter of the cap.

FIG. 1 shows that the pin 13 of the rod 14 is close to the outermost convolution of the spring 15. Therefore, the initial bias of the spring (in the open position of the flap 4) is small or negligible. The pitch of the spring 15 is then the same as or closely approximates the lead of the threads in the cap 12. If the operator wishes to change the resistance of the spring 15 to rotation of the flap 4 to open position, the cap 12 is rotated clockwise or anticlockwise. If the cap is rotated in a direction to move the pin 13 toward the shaft 3, the effective length of the spring 15 is reduced and the spring offers a greater resistance to pivoting of the flap 4 from the open toward the closed position. In view of the aforementioned relationship between the lead of the threads in the cap 12 and the pitch of the convolutions of spring 15, the initial stress of the spring remains unchanged; however, the bias increases more rapidly in response to pivoting of the flap 4 from open position if the pin 13 is nearer to the shaft 3.

The partition 10 is coplanar with and is installed downstream of the shaft 3. It includes a substantially rectangular or square portion 10a which is located immediately downstream of the shaft 3 and a rounded portion 10b located downstream of the rectangular portion 10a and bounded by a convex (preferably substantially semicircular) edge face 10d. The rectangular portion 10a divides the corresponding portion of the passage 1a into two substantially identical mirror symmetrical channels. The outline of the edge face 10d is an image of the edge face of the section 4b when the latter assumes the intermediate position which is indicated by phantom lines (see the dotted line 10e in FIG. 1). Such dotted line represents the inner surface of the stream of fluid which flows through the lower part of the housing (as viewed in FIG. 1) in the intermediate position of the section 4B. The space 10f between the partition 10 and flap section 4B is hydrodynamically sealed and remains free of turbulence which could cause the flap 4 to flutter. Otherwise stated, the fluid which fills the space 10f acts not unlike a cushion which opposes the tendency of the flap 4 to flutter in response to changes in the speed and/or other characteristics of fluid flowing through the housing 1.

Each of the two bearings 30 comprises a relatively short metallic internally threaded member or sleeve 31 the radially innermost portion of which extends into a shallow annular recess provided therefor in the external surface of the housing 1. Each sleeve 31 can be soldered, welded, glued or otherwise bonded to the housing 1 and surrounds an aperture in the housing for the respective end portion of the shaft 3. The internal threads of the sleeves 31 mate with the external threads of plug-shaped members 32 each of which can be said to constitute a screw with a slot 32a at its outer end to receive the working end of a screwdriver or another suitable tool. As best shown in FIG. 3, the inner end face of each plug 32 has an axial blind bore or socket 33 which receives the respective end portion of the shaft 3 with a certain amount of radial clearance. The plugs 32 preferably consist of suitable synthetic plastic material. The deepmost portion of each socket 33 receives a spherical element 34 which abuts against the bottom surface of the socket as well as against the respective end face 3a of the shaft 3. By rotating the plug 32 relative to its sleeve 31, one can change the pressure between the spherical element 34 on the one hand and the plug 32 and shaft 3 on the other hand. The pressure with which the end portions of the shaft 3 bear against the respective spherical elements 34 can be readily selected in such a way (by rotating at least one of the plugs 32 relative to the corresponding sleeve 31) that both end faces 3a of the shaft 3 are subjected to relatively small axial stresses and that the flap 4 is held in a position in which its sections 4A, 4B do not rub against the internal surface of the housing 1 when the shaft 3 is caused to turn.

It will be seen that each of the bearings 30 constitutes a combined axial and radial bearing. The radial clearance with which the end portions of the shaft 3 are received in the sockets 33 can be quite pronounced (such clearance has been exaggerated in FIG. 3 for the sake of clarity) because the tendency of the end portions of the shaft to move sideways is opposed by the spherical elements 34 which abut against the end faces 3a as well as against the bottom surfaces of the respective sockets 33. The elements 34 also offer some (but hardly perceptible) opposition to rotation of the shaft 3 with the flap 4. As a rule, the end faces 3a of the shaft 3 will be made smooth prior to insertion into the bearings 30. For example, the shaft 3 can be severed from rod-shaped metallic stock and its end faces subjected to a grinding, polishing or analogous treatment prior to assembly with other parts of the flow regulator. The point of contact between a spherical element 34 and the respective end face 3a may but need not lie on the axis of the shaft 3; if not, the point of contact will travel in response to rotation of the shaft which can result in slightly increased friction between the peripheral surface of the shaft and the cylindrical surfaces bounding the sockets 32, especially if the end faces 3a are not exactly normal to the shaft axis.

The purpose of the flap 4 is to insure that the quantity of fluid flowing through the housing 1 remains unchanged even if the pressure of inflowing fluid varies. When the fluid pressure increases, the sections 4A, 4B of the flap move nearer to their broken-line positions and thereby stress the spring 15.

The improved bearings can be modified in a number of ways without departing from the spirit of the invention. For example, the end portions of the shaft 3 can be provided with hemispherical (convex) surfaces which bear directly against the flat or nearly flat bottom surfaces in the respective sockets. In such bearings, too, a point contact (or a type of contact which comes close to the point contact) can be established by providing each bearing with a surface which is contacted by an end surface of the shaft whereby one of such surfaces constitutes a convex surface (in the illustrated embodiment, the convex surface is the external surface of the spherical element 34) and the other surface constitutes a flat or substantially flat surface. Such types of bearings insure that the point of contact between the two surfaces is on or close to the axis of the shaft (or on or close to the axis of that part of the bearing which defines the socket for the respective end portion of the shaft). Friction between the surfaces of such thrust bearings is negligible while the surfaces positively prevent axial movements of the shaft which, combined with eventual radial displacement of the end portions of the shaft, could result in excessive stray movements of the flap relative to the housing of the flow regulator.

If the bearings 30 employ spherical elements, such elements preferably consist of a hard material whose surface is not affected by prolonged use. Steel balls of the type used in antifriction ball bearings are eminently suited for use in the bearings 30. The balls of ball bearings are surface-hardened so that they are highly unlikely to undergo rapid or pronounced wear in the flow regulator. Moreover, such balls can be mass-produced at reasonable cost in available machinery and with an extremely high degree of reproducibility, i.e., each of a large number of balls will have a diameter which equals the desired norm. Still further, if the external surfaces of balls are treated to a high degree of finish, it is not necessary to subject the end surfaces 3a of the shaft 3 to extensive treatment; in fact, the end surfaces need not be treated at all. It has been found that the improved bearings will operate quite satisfactorily if the surfaces of the spherical elements 34 are smooth and the end surfaces 3a of the shaft 3 are rough or include smooth and rough portions. Such rough surfaces or surface portions exhibit a negligible adverse influence on the ability of the shaft 3 to turn with the flap 4 in response to changes in the speed of the fluid column in the housing 1.

It is further within the purview of the invention to simplify the construction of one of the bearings 30. For example, if the upper bearing 30 of FIG. 2 is constructed and assembled in a manner as shown in detail in FIG. 3, the lower bearing may include a one-piece female bearing element which replaces the parts 31, 32 and is merely provided with an internal socket for the spherical element 34.

The axial stress upon the shaft 3 is relatively small, e.g., in the range of 300-500 g. If desired, the axial stressing can be effected by resorting to suitable resilient means, e.g., rubber pads or springs.

It has been found that the improved bearings can be used with particular advantage in a fluid flow regulator of the type disclosed in my U.S. Pat. No. 3,965,928.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the claims.

What is claimed is:

1. In a fluid flow regulator wherein the passage for a fluid medium within a tubular housing is traversed by a rotary shaft having first and second end portions and supporting a valving element including two mutually inclined sections and being turnable by the fluid with said shaft between spaced apart first and second positions in which said element respectively permits and prevents the flow of fluid through said housing, the improvement which consists in the provision of first and second thrust bearings secured to said housing and receiving the respective end portions of said shaft, at least said first bearing including means for axially stressing said shaft.

2. The improvement of claim 1, wherein at least one of said bearings has a socket which receives the respective end portion of said shaft with radial clearance.

3. The improvement of claim 1, wherein at least one of said bearings has a first surface and the respective end portion of said shaft has an end surface abutting against said first surface, one of said surfaces being convex and the other of said surfaces being substantially flat so that said surfaces are essentially in mere point contact with each other.

4. The improvement of claim 1, wherein at least one of said bearings includes a spherical element and the respective end portion of said shaft has a substantially flat surface abutting against said spherical element.

5. The improvement of claim 4, wherein said one bearing has a socket for said spherical element.

6. The improvement of claim 1, wherein said first bearing includes an internally threaded member which is supported by said housing and said stressing means includes an externally threaded member which mates with said internally threaded member and is rotatable with respect thereto to thereby move substantially axially of said shaft.

7. The improvement of claim 6, wherein said externally threaded member consists of synthetic plastic material.

8. The improvement of claim 6, wherein said externally threaded member has a socket for the respective end portion of said shaft.

9. The improvement of claim 8, wherein said one bearing further comprises a spherical element received in said socket and abutting against the respective end portion of said shaft.

10. The improvement of claim 9, wherein said end portions of said shaft extend outwardly through and beyond said housing and said internally threaded member is secured to the exterior of said housing.

11. The improvement of claim 9, wherein said spherical element is a surface-hardened metallic ball.

* * * * *